Figure 1:
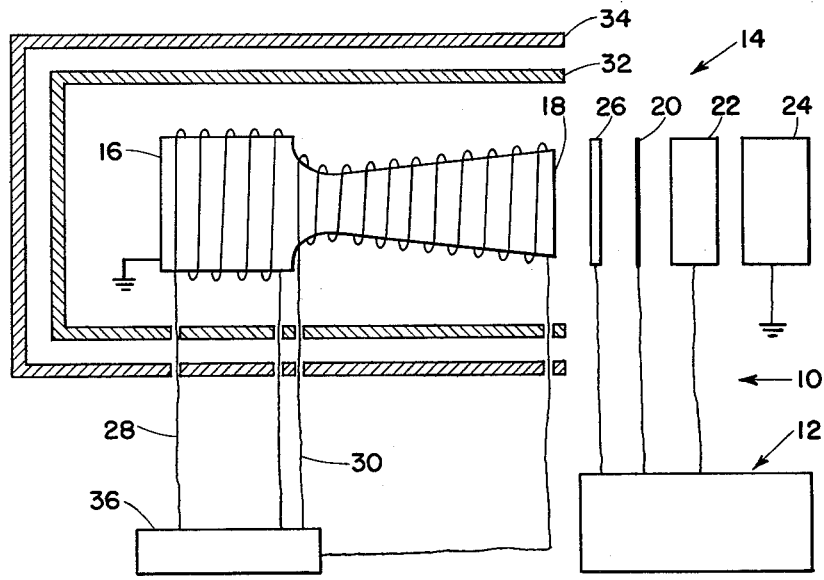

March 16, 1965  C. T. NORGREN  3,173,246
COLLOID PROPULSION METHOD AND APPARATUS
Filed March 12, 1963

INVENTORS
CARL T. NORGREN

BY

ATTORNEYS

3,173,246
COLLOID PROPULSION METHOD AND APPARATUS
Carl T. Norgren, North Olmsted, Ohio, assignor to the United States of America as represented by the Administrator of the National Aeronautics and Space Administration
Filed Mar. 12, 1963, Ser. No. 264,735
10 Claims. (Cl. 60—35.3)
(Granted under Title 35, U.S. Code (1952), sec. 266)

The invention described herein may be manufactured and used by or for the Government of the United States of America for governmental purposes without the payment of any royalties thereon or therefor.

This invention is concerned with a method and apparatus for propelling space vehicles, and more particularly with an onboard colloidal particle generator for an electro static engine. The invention is especially concerned with an improved thrustor which utilizes a colloidal particle generator.

Colloidal particle electrostatic rocket engines have been proposed as propulsion systems for space missions where specific impulses from 1,000 to 10,000 seconds are required. High power efficiency, high propellant utilization, reasonable field strengths, physical and electrical reliability, light weight, and long-duration operation are all required of these engines.

Various methods have been used to form colloidal particles such as expanding material into a cooling or calming chamber through a high pressure nozzle. Chemical reactions such as the action of ammonia vapor in hydrogen chloride have likewise been utilized along with the oxidation of a particle forming material. Colloidal particles have also been produced by physical grinding such as mechanical disintegration in a colloidal mill.

These techniques have disadvantages when applied to propulsion systems. For example, the atomization of a material, such as a liquid, tends to produce a very poor size distribution which is completely unsuitable for an electrostatic engine. Other devices which provide good size distribution of the particles do not produce a sufficient quantity of particles to be useful. Also methods which produce relatively uniform prepared particles often require a carrier, and it can be quite difficult to separate the particles from the carrier. Moreover, even when the particles are separated from the carrier they tend to form aggregates which are very difficult to separate.

These problems have been solved by the present invention which utilizes the condensation of a homogenous vapor in a supersonic nozzle to obtain sub-micron sized colloidal particles. In this manner vaporization, nucleation, condensation, aggregation and possible revaporization occur at an extremely rapid rate, on the order of one millisecond. According to the present invention a material is vaporized and then passed through a convergent-divergent nozzle wherein adiabatic expansion of the vapor produces the required supersaturation for particle growth. The collision rate of the particles is controlled by the physical properties of the vapor as well as the dimensions of the apparatus, and in this manner the particle growth rate and size is controlled so that the particles have atomic mass units (a.m.u.'s) that are narrowly distributed in a predetermined mass range. The system is operated at a maximum pressure determined by the vapor pressure of the material; consequently the exhaust pressure can vary from a hard vacuum to a relatively high pressure and still produce colloidal particles.

The method and apparatus for generating colloidal particles according to the present invention can be used in numerous types of spacecraft. The colloidal particles are charged at the nozzle exhaust by any convenient means, such as a corona discharge. The resulting particles are then accelerated by suitable means such as an electrostatic accelerator. It is likewise contemplated that the colloidal particles can be charged in an electron bombardment engine and then accelerated. In an alternate embodiment of the invention the colloidal particles are accelerated in the nozzle alone to supply small corrections to planned orbits.

It is, therefore, an object of the present invention to provide an improved method of propulsion in which sub-micron sized particles are utilized which enables realistic accelerating potentials to be used.

Another object to the invention is provide an improved thrustor which utilizes a colloidal particle generator having a supersonic nozzle.

Other objects of the invention will be apparent from the specification which follows and from the drawings in which like numerals are used throughout to identify like parts.

Figure 2:
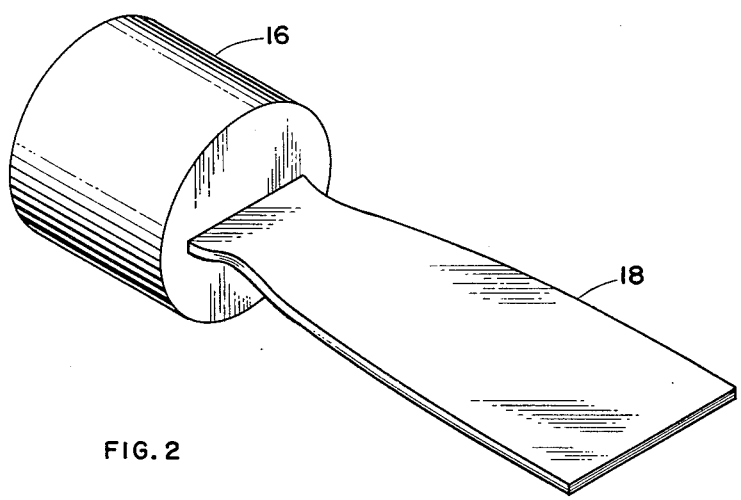

FIG. 1 is a schematic view of an electrostatic engine having a thrustor constructed in accordance with the invention, and FIG 2 is a perspective view of a colloid particle generator of the invention.

Referring now to the drawings there is shown in FIG. 1 an electrostatic engine 10 for rockets and the like that may be used with electric spacecraft. The electrostatic engine 10 comprises a power supply 12 and a thrustor 14. The power supply 12 may be any of a number of different types such as a nuclear reactor that is used to drive a turbine or a nuclear battery.

The thrustor 14 comprises a propellent vaporizer 16, a supersonic nozzle 18, charging means 20, and accelerators 22 and 24. An electron trap 26 is provided where the vaporizer 16 and the nozzle 18 are operated at ground potential to prevent the back streaming of electrons from the charging means 20.

The vaporizer 16 and the nozzle 18 comprise a colloidal particle generator which is indirectly heated in a conventional manner for supplying sub-micron sized particles to be charged and accelerated. By way of example, an A.C. Nichrome heating unit 28 wound around the vaporizer 16 and a similar heating unit 30 wound around the nozzle 18 have been successfully used. Heat shields 32 and 34 are provided to reduce radiation heat losses. The heating units 28 and 30 are connected to an auxiliary power supply 36 and the entire colloidal particle generator is maintained at a zero potential with respect to ground.

In operation, a supply of propellent is enclosed in the vaporizer 16 and heated by the heating unit 28 to form a homogenous vapor which is then expanded in the nozzle 18 to form sub-micron sized colloidal particles. The heating unit 30 prevents condensation of these particles on the nozzle surface.

The particle formation on a nozzle condensation process is highly complex, and is dependent primarily on reaching a critical nucleation rate in the vapor flow. This rate is a function of the supersaturation, temperature, and physical properties of the propellent in the vapor stream.

Supersaturation is controlled by the flow rate in the nozzle 18. Because the nozzle throat functions as a critical flow orifice, the vapor pressure of the propellent in the vaporizer 16 must be high enough so that adiabatic expansion can occur in the nozzle 18. This expansion creates the necessary conditions for the supersaturation required in nuclei formation. The vapor pressure of the propellent in the vaporizer 16 is controlled by regulating the power input to the heating unit 28.

A predetermined supersaturation is required for nucleation, and for some materials this state is reached ahead of the nozzle throat. In this situation subsequent expansion is not required for nucleation; however, the expansion does cool these materials. This cooling is necessary to reject heat from the vapor stream to insuure efficient formation of sub-micron colloidal particles from nuclei. The process is stopped with the formation of nuclei if low mass particles are desired. The formation of the stable nuclei is quite complex and can vary from 100 a.m.u.'s to over 600,000 a.m.u.'s for different materials.

While an important function of the nozzle 18 is to provide for supersaturation so that nuclei can be formed from a given material, it further insures an adequate mass flow rate at a given supersaturation to provide a sufficient quantity of nuclei suitable for use in an electrostatic engine. Also the length of the nozzle 18 is selected to provide the required time necessary for nuclei formation and/or particle growth. The nozzle has an expansion ratio which not only provides the supersaturation required for nuclei formation but also insures cooling so an efficient conversion of vapor to particles can occur from a thermo-dynamic viewpoint.

Particles in the range of $10^3$ to $10^5$ a.m.u.'s are preferred because they can be accelerated to a desired impulse by reasonable accelerating voltages. Particles in this size range are formed from large nuclei or by condensing vapor on a small nucleous. Particles having a size in the range of $10^5$ to $10^8$ a.m.u.'s are easier to handle and are formed by condensation and agglomeration of the smaller particles.

Referring to FIG. 2 there is shown a typical colloidal particle generator constructed in accordance with the invention. This embodiment utilizes a convergent-divergent nozzle 18 that has a length of 15.5 centimeters and a rectangular throat 0.273 by 4.48 centimeters. The total turning angle for expansion is taken at the throat of the nozzle 18 while the remainder of the length is used to cancel reflecting shock waves. The nozzle 18 is characterized as supersonic because the velocity of the propellent flow through the throat is sonic, and the subsequent expansion produces supersonic velocities.

By way of example mercurous chloride propellent which was vaporized in the vaporizer 16 shown in FIG. 2 at a temperature of 480° F. gave a particle size of $10^6$ a.m.u.'s. Mercuric chloride vaporized at temperatures of 400°F. and 430°F. gave particle sizes of $10^6$ and $10^8$ a.m.u.'s respectively. Aluminum chloride vaporized at temperatures of 180°F. and 220°F. produced particles having sizes of $10^3$ and $10^5$ a.m.u.'s respectively.

At the nozzle exit the condensed particles may be considered analogous to molecular flow; for example, pressures in the order of $10^{-4}$ mm. Hg are common in this region.

Upon leaving the nozzle 18 these particles are charged by electron attachment. In a preferred embodiment for use with an electrostatic thrustor the charging means 20 comprises a negative corona discharge from a wire connected to the power source 12. A negative corona discharged is preferable for charging the particles because the high voltages necessary for high impulse can be placed on the wire without breakdown at the low pressures encountered adjacent the nozzle exit. In addition, because the electrons are supplied from a relatively cold source no undesirable heat is added to the system which would affect nucleation or over-all efficiency.

It is also possible to positively charge the particles. Positive charging by electron bombardment is contemplated as well as positive charging by ion attachment. Positive static charging by particle rupture can be used along with static charging by contact with surfaces having high surface field strengths. The particles may likewise be positively charged by a radioactive source.

The accelerator 22 is connected to the power supply 12 while the accelerator 24 is grounded. By way of example, the accelerator plates 22 and 24 may be formed from metal foil that is supported on a relatively light frame.

While one example of the invention has been disclosed and described it will be appreciated that various modifications may be made to the structure as well as the method without departing from the spirit of the invention or the scope of the subjoined claims. For example, it is contemplated that water as well as carbon dioxide may be used as the propellent in the colloidal engine.

What is claimed is

1. A method of propulsion comprising the steps of vaporizing a material,
expanding said material in a supersonic nozzle, condensing said material to form a plurality of sub-micron sized colloidal particles,
charging said particles, and
accelerating said particles.

2. A method of propulsion comprising the steps of heating a coloidal particle forming material to vaporize the same,
expanding said vaporized material in a supersonic nozzle,
controlling the flow rate of said vaporized material in said nozzle and subsequent supersaturation therof to form a plurality of nuclei,
charging said nuclei, and
accelerating said nuclei.

3. A method of propulsion as claimed in claim 2 including the step of
regulating the temperature of said colloidal particle forming material to control the vaporization pressure thereof.

4. A method of propulsion as claimed in claim 2 including the step of
negatively charging said nuclei by electron attachment with a negative corona discharge.

5. A method of propulsion as claimed in claim 2 including the step of
positively charging said nuclei.

6. A method of propulsion as claimed in claim 2 including the step of
condensing material on said nuclei to form a plurality of particles, each have a mass in the range between $10^3$ to about $10^5$ a.m.u.'s.

7. A method of propulsion as claimed in claim 6 including the step of
agglomerating said condensed material to form a plurality of particles, each having a mass in the range between about $15^5$ to $10^8$ a.m.u.'s.

8. Propulsion apparatus comprising
a generator for forming a plurality of sub-micron sized colloidal particles having a relatively narrow distribution in the range about $10^3$ to about $10^8$ a.m.u.'s, said generator comprising
a vaporizer having meanse for controlling the temperature of a colloidal particle forming material to heat the same thereby forming a vapor, and
a nozzle for receiving said vapor,
a relatively cold wire having a voltage thereon to form a negative corona discharge for charging said particles by electron attachment, and
means for accelerating said particles electrostatically.

9. An electrostatic engine comprising
a power supply, and
a thustor including
a colloidal particle generator for forming sub-micron sized particles, each having a mass in the range between about $10^3$ to about $10^8$ a.m.u.'s, said colloidal particle generator comprising means for heating a material to vaporize the same and a nozzle for receiving said vapor,
a wire connected to said power supply for providing a negative corona discharge to charge said particles, and accelerator means for accelerating said charged particles.

10. An electrostatic engine comprising a power supply, and a thrustor including a colloidal particle generator for forming submicron sized particles, each having a mass in the range between about $10^3$ to about $10^8$ a.m.u.'s, said colloidal generator comprising means for heating a material to vaporize the same and a nozzle for receiving said vapor, a wire connected to said power supply for providing a negative corona discharge to charge said particles, an electron trap positioned between said nozzle and said wire, and accelerator means for accelerating said charged particles.

References Cited by the Examiner

UNITED STATES PATENTS

| | | | |
|---|---|---|---|
| 2,754,442 | 7/56 | Boutry et al. | 313—62 |
| 2,880,337 | 3/59 | Langmuir et al. | 60—35.5 |
| 2,883,568 | 4/59 | Beam et al. | 60—35.5 |
| 3,073,984 | 1/63 | Eschenbach et al. | 313—63 |
| 3,120,736 | 2/64 | Gignoux | 60—35.5 |
| 3,122,882 | 3/64 | Schultz et al. | 60—35.5 |

SAMUEL LEVINE, *Primary Examiner.*

UNITED STATES PATENT OFFICE
CERTIFICATE OF CORRECTION

Patent No. 3,173,246 March 16, 1965

Carl T. Norgren

It is hereby certified that error appears in the above numbered patent requiring correction and that the said Letters Patent should read as corrected below.

Column 4, line 20, for "coloidal" read -- colloidal --; line 44, for "have" read -- having --; line 50, for "$15^5$" read -- $10^5$ --; line 54, after "range" insert -- between --; same column 4, line 56, for "meanse" read -- means --; column 5, line 11, after "colloidal" insert -- particle --.

Signed and sealed this 24th day of August 1965.

(SEAL)
Attest:

ERNEST W. SWIDER
Attesting Officer

EDWARD J. BRENNER
Commissioner of Patents